(12) United States Patent
Prashant et al.

(10) Patent No.: US 11,809,276 B2
(45) Date of Patent: Nov. 7, 2023

(54) CONTAINER-BASED STATEFUL APPLICATION RESILIENCE TO NODE FAILURE

(71) Applicant: EMC IP Holding Company LLC, Hopkinton, MA (US)

(72) Inventors: Kumar Prashant, Muzaffarpur (IN); Thomas L Watson, Richardson, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 237 days.

(21) Appl. No.: 17/186,562

(22) Filed: Feb. 26, 2021

(65) Prior Publication Data

US 2022/0276929 A1 Sep. 1, 2022

(51) Int. Cl.
| | | |
|---|---|---|
| *G06F 11/20* | (2006.01) | |
| *G06F 11/14* | (2006.01) | |
| *G06F 11/16* | (2006.01) | |
| *G06F 11/07* | (2006.01) | |
| *G06F 9/48* | (2006.01) | |

(Continued)

(52) U.S. Cl.
CPC .......... *G06F 11/142* (2013.01); *G06F 9/4881* (2013.01); *G06F 9/505* (2013.01); *G06F 9/5077* (2013.01); *G06F 11/0772* (2013.01); *G06F 11/1662* (2013.01); *G06F 11/3034* (2013.01)

(58) Field of Classification Search
CPC ...... G06F 9/4881; G06F 9/505; G06F 9/5077; G06F 11/1662; G06F 11/3034; G06F 11/203; G06F 11/2023

See application file for complete search history.

(56) References Cited

U.S. PATENT DOCUMENTS

2005/0005200 A1* 1/2005 Matena ............... G06F 11/1482
714/38.13
2007/0022138 A1* 1/2007 Erasani ............... G06F 11/0727
(Continued)

OTHER PUBLICATIONS

G. Saenger et al., "Pod Safety, Consistency Guarantees, and Storage Implications," https://github.com/kubernetes/community/blob/master/contributors/design-proposals/storage/pod-safety.md, Oct. 2016, 10 pages.

(Continued)

*Primary Examiner* — Joseph O Schell
(74) *Attorney, Agent, or Firm* — Ryan, Mason & Lewis, LLP

(57) ABSTRACT

Techniques for managing node failures in container environments are disclosed. In one example, a method determines when a first node executing at least one containerized workload has failed. In response to determining the first node has failed, the method marks a configuration object for the first node with an indicator that the first node is not to be used to schedule execution of a subsequent containerized workload, isolates from the first node one or more storage volumes used by the first node, and deletes configuration objects for the one or more storage volumes and for the containerized workload. The method then causes creation of a replacement containerized workload for execution on a second node, removes one or more artifacts associated with the containerized workload from the first node, and removes the indicator from the configuration object for the first node.

20 Claims, 12 Drawing Sheets

(51) Int. Cl.
    *G06F 9/50*       (2006.01)
    *G06F 11/30*      (2006.01)

(56) References Cited

U.S. PATENT DOCUMENTS

| | | | | |
|---|---|---|---|---|
| 2014/0108861 | A1* | 4/2014 | Abadi | G06F 11/2028 |
| | | | | 707/718 |
| 2018/0341519 | A1* | 11/2018 | Vyas | G06F 9/5072 |
| 2019/0278494 | A1* | 9/2019 | Dev | G06F 13/1668 |
| 2020/0097204 | A1* | 3/2020 | Sato | G06F 11/203 |
| 2020/0136943 | A1* | 4/2020 | Banyai | H04L 43/20 |
| 2021/0064442 | A1* | 3/2021 | Alluboyina | G06F 9/5011 |
| 2021/0133059 | A1* | 5/2021 | Bono | G06F 11/2082 |
| 2022/0116285 | A1* | 4/2022 | Abdollahi Vayghan | |
| | | | | H04L 41/0668 |
| 2022/0138036 | A1* | 5/2022 | Beekhof | G06F 11/0793 |
| | | | | 709/224 |
| 2022/0188192 | A1* | 6/2022 | Wang | G06F 11/1438 |
| 2023/0195497 | A1* | 6/2023 | Ota | G06F 9/45558 |
| | | | | 718/1 |

OTHER PUBLICATIONS

N. Yehia, "Kubernetes Self Remediation (AKA Poison Pill)," https://www.openshift.com/blog/kubernetes-self-remediation-aka-poison-pill, Nov. 18, 2020, 4 pages.

N. Yehia, "Poison Pill k8s Node Remediation," https://github.com/poison-pill/poison-pill, Dec. 30, 2020, 2 pages.

Github, "HPE CSI Driver for Kubernetes," https://github.com/hpe-storage/csi-driver, accessed Feb. 4, 2021, 3 pages.

Github, "Stork—Storage Operator Runtime for Kubernetes," https://github.com/libopenstorage/stork, accessed Feb. 4, 2021, 8 pages.

"Promote Taint Based Evictions to GA," https://github.com/kubernetes/enhancements/tree/master/keps/sig-node/166-taint-based-eviction#summary, Oct. 13, 2021, 3 pages.

"Graduate TaintNodeByCondition to GA," https://github.com/kubernetes/enhancements/tree/master/keps/sig-scheduling/382-taint-node-by-condition#summary, Oct. 13, 2021, 3 pages.

"Add Non-Graceful Node Shutdown KEP #1116," https://github.com/kubernetes/enhancements/pull/1116, Feb. 3, 2022, 54 pages.

* cited by examiner

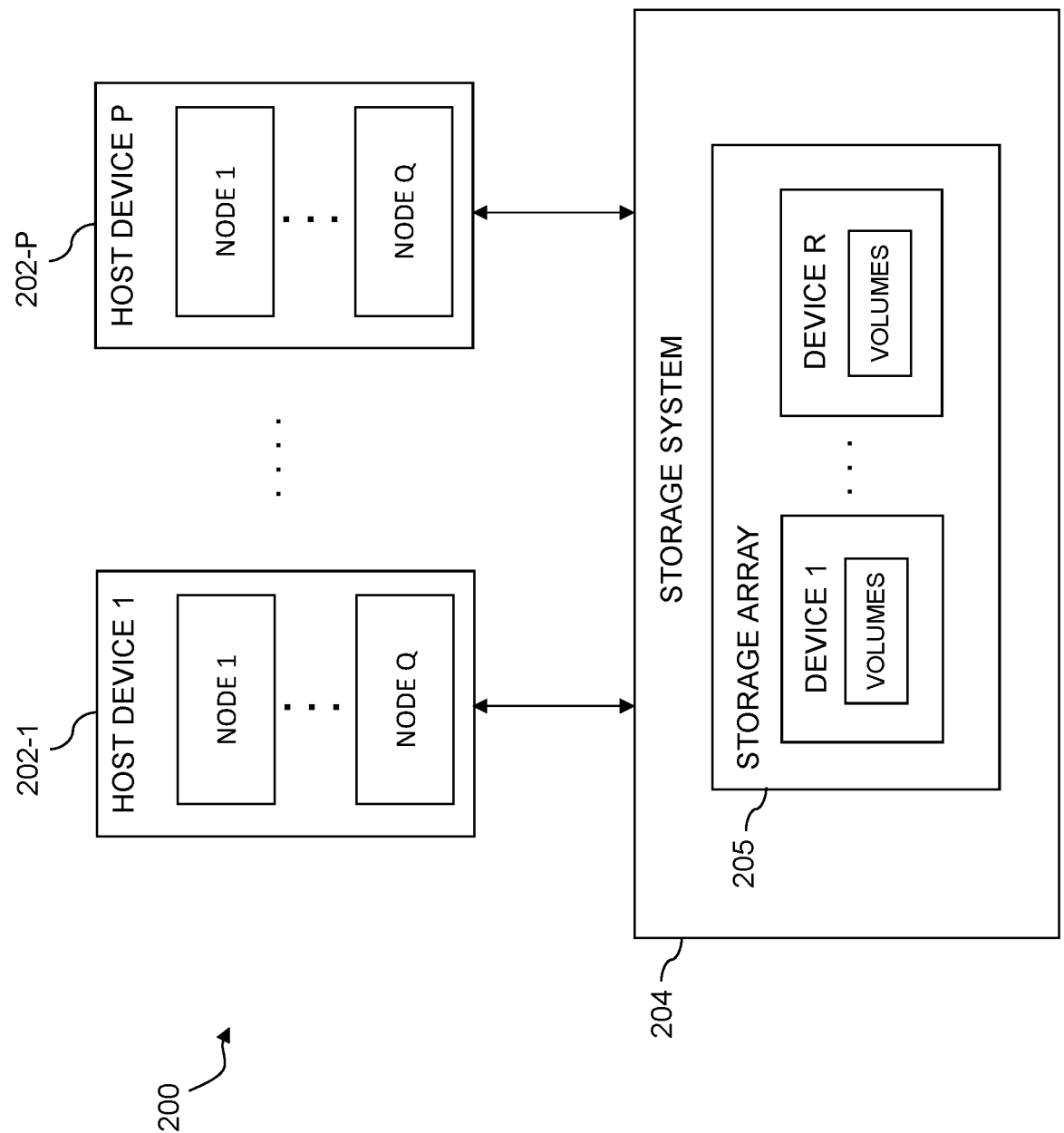

CONTAINER-BASED STATEFUL APPLICATION RESILIENCE TO NODE FAILURE

FIELD

The field relates generally to information processing systems, and more particularly to management of container environments.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. However, significant challenges arise in managing container environments especially in the case of a failure of the host device or a node upon which a container executes.

SUMMARY

Illustrative embodiments provide techniques for managing node failures in container environments.

For example, in an illustrative embodiment, a method comprises the following steps. The method determines when a first node executing at least one containerized workload in an information processing system has failed. In response to determining the first node has failed, the method marks a configuration object for the first node with an indicator that the first node is not to be used to schedule execution of a subsequent containerized workload. The method isolates, from the first node, one or more storage volumes used by the first node when executing the containerized workload. The method deletes configuration objects for the one or more storage volumes and for the containerized workload executed by the first node. The method causes creation of a replacement containerized workload for execution on a second node in the information processing system. The method removes one or more artifacts associated with the containerized workload from the first node. The method removes the indicator from the configuration object for the first node.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, resilience for application programs executing in the container environment. In one or more illustrative embodiments, a containerized workload is executed as a pod on a given node of the container environment. While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIG. 2 illustrates host devices and a storage system within which one or more illustrative embodiments can be implemented.

DETAILED DESCRIPTION

Figure 1:
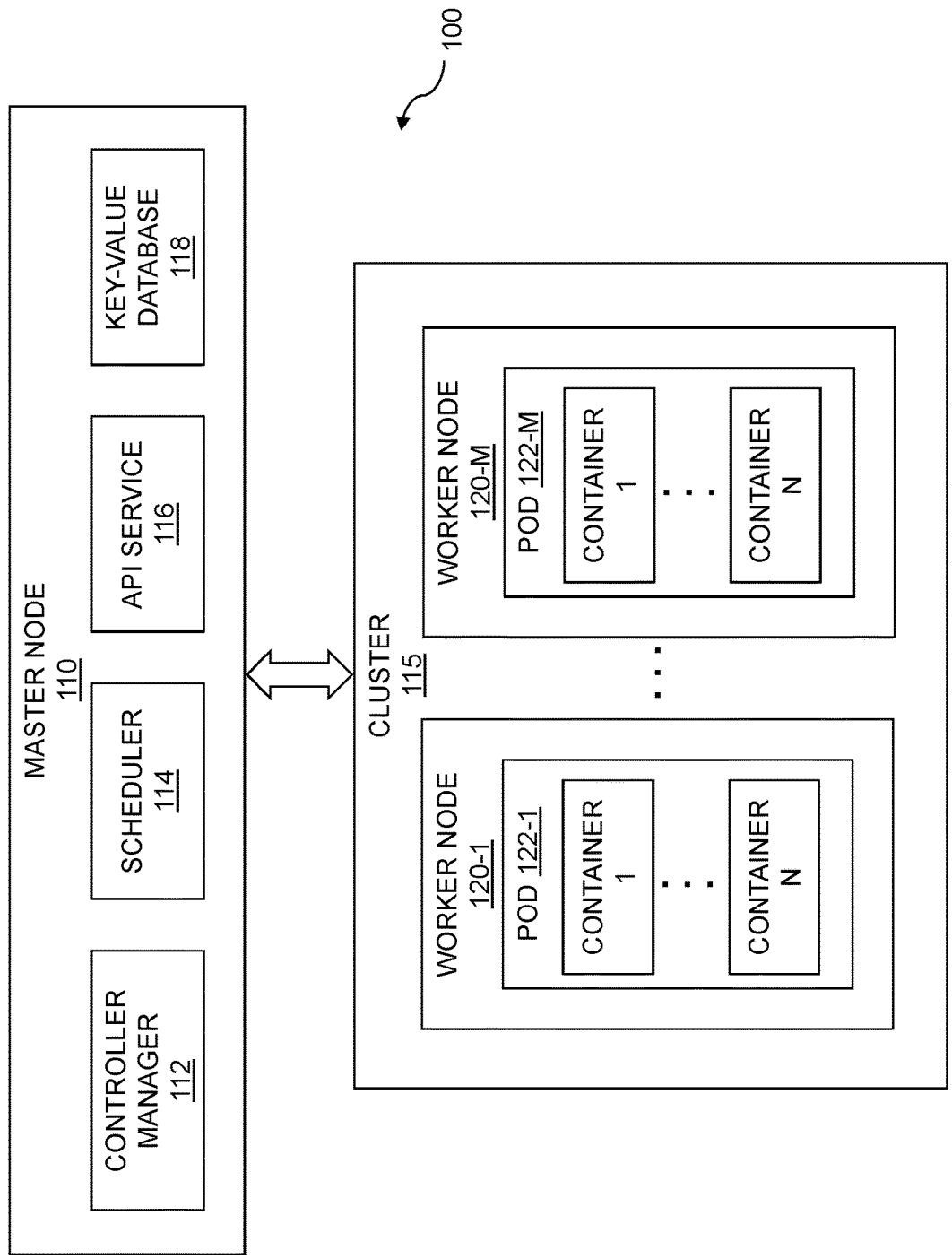
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based environment comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (application). By way of example only, such applications may include both newly architected stateless or inherently redundant scale-out applications, as well as existing stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by one or more master nodes. By way of example, pods represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Further, pods may each have persistent storage volumes associated therewith. Configuration information (configuration objects) indicating how a container executes can be specified for each pod.

FIG. 1 depicts an example of a pod-based container orchestration environment 100. As shown, a master node 110 is operatively coupled to a cluster 115. The cluster 115 comprises a plurality of worker nodes 120-1, . . . 120-M (herein also individually referred to as worker node 120 or collectively as worker nodes 120). Each worker node 120 comprises a respective pod, i.e., one of a plurality of pods 122-1, . . . 122-M (herein also individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, master node 110 comprises a controller manager 112, a scheduler 114, an application programming interface (API) service 116, and a key-value database 118, as will be further explained.

Worker nodes 120 of cluster 115 execute one or more applications associated with pods 122 (containerized workload). The master node 110 manages the worker nodes 120, and therefore pods 122 and containers, in cluster 115. More particularly, master node 110 controls operations in cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

FIG. 2 illustrates an information processing system 200 within which pod-based container orchestration environment 100 of FIG. 1 can be implemented. More particularly, as shown in FIG. 2, a plurality of host devices 202-1, . . . 202-P (herein also individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises at least one storage array 205 which is comprised of a set of storage devices 1, . . . R upon which one or more storage volumes are persisted. The storage volumes depicted in the storage devices of storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a master node 110 or a worker node 120 (FIG. 1). In some embodiments, a node can be configured as a master node for one execution environment and as a worker node for another execution environment. Thus, the components of the pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . R of storage array 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one storage array 205, in other embodiments, host devices 202 may be coupled to and configured for operation with multiple storage arrays across the same storage system 204 or multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

It is realized herein that container orchestration environments such as the pod-based environment of Kubernetes may include container metrics that are defined and managed, but are known to lack effective techniques for managing failures in the container environment, e.g., a node failure. Thus, there is a need for container management systems configured to provide application resilience particularly in view of a node failure.

In Kubernetes, a stateful set controller assists with creating pods with one or more containers to deploy stateful applications. The stateful set controller also creates and manages a set of configuration objects containing configuration information for a given stateful application program being deployed in the container environment. The stateful set controller guarantees that there will only be a single instance of a container using a persistent volume at any point in time, however, it does not guarantee that such a container will be highly available. Instead, Kubernetes uses an eventual consistency model, where it will eventually strive to make the actual system state match the desired deployment state specified in the Kubernetes configuration objects of the stateful set.

The eventual consistency model is particularly problematic when it is faced with various node failure scenarios. Although the Kubernetes system will detect a node failure in approximately 30 seconds using a heartbeat detection mechanism, Kubernetes cannot be certain whether the node has failed because it has ceased to operate or whether the node has experienced a loss of communication with the rest of the Kubernetes cluster. Because of this uncertainty, Kubernetes cannot terminate pods (and the corresponding groups of application containers) created by the stateful set controller, because it has lost communication with the node running the pods, and it will not create replacement pods because it cannot be certain whether the old pods are no longer executing.

Existing data processing environments have attempted to solve this problem using a fencing controller, a mechanism which isolates the failed node from other parts of the system, including any persistent volumes in a storage system, which then allows a replacement copy of the application to be created.

Illustrative embodiments provide improved techniques for implementing node failure management in a pod-based (e.g., Kubernetes) system that can isolate a node even though it is unable to distinguish whether the node is physically down or is suffering a communication failure. More particularly, illustrative embodiments force deletion of the one or more pods on a failed node, and cause creation and scheduling of replacement pods to healthy nodes. This results in the ability to restore these stateful applications to healthy operation in a timely manner when a node fails.

Such improved pod-based container management operations are illustratively depicted in the context of FIGS. 3A through 3H and within an information processing system 300. It is to be appreciated that information processing system 300 represents an illustrative embodiment that can be implemented in accordance with the system architectures of FIGS. 1 and 2, although alternative embodiments can employ different system architectures. More particularly, as shown in FIGS. 3A through 3H for ease of explanation, the pod-based container management approach of information processing system 300 is shown in functional component groupings, i.e., physical nodes and containers 301, physical storage system 302, API objects 303, and controllers 304. Thus, for example, physical nodes and containers 301 may be implemented in host devices 202, physical storage system 302 may be implemented in storage system 204, API objects 303 may be stored in key-value database 118 of master node 110 (and thus can be implemented on one or more host devices 202), and controllers 304 can be implemented in or otherwise controlled by controller manager 112 of master node 110 (and thus can also be implemented on one or more host devices 202).

In accordance with information processing system 300, a pod monitor ("podmon") architecture is implemented that, inter alia, interacts with the Kubernetes application programming interface (API), a container storage interface (CSI) driver that provisions persistent storage, and the state of the nodes on which pods are deployed. Podmon architecture is subdivided into two functional components, i.e., controller-podmon and node-podmon, as will be further explained in detail below. In some embodiments, the podmon architecture may, itself, be implemented as a container-executable application.

Assume, as shown in this illustrative embodiment, that a node 310-1 (NODE 1) is currently executing a pod 312-1 (POD 1) and a node-podmon 314-1. Also assume that two mapped volumes 316 (V1 and V2) are associated with pod 312-1. The mapped volumes 316 represent data that is generated in accordance with the execution of a containerized application running in pod 312-1 on node 310-1. Also, assume that a second node, node 310-2 (NODE 2) currently executes a node-podmon 314-2, however, no pods are currently instantiated on node 310-2.

Figure 3A:
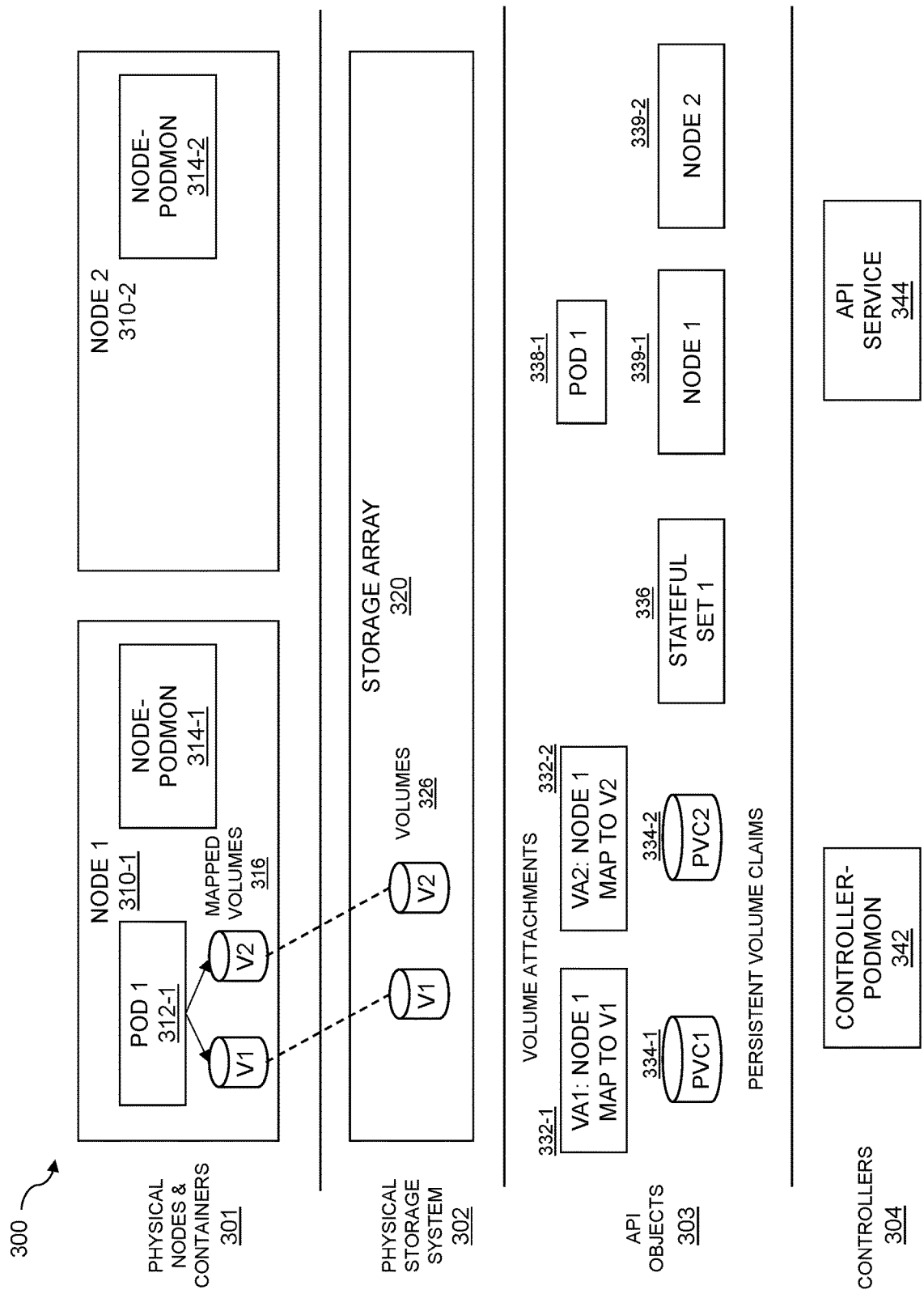
FIGS. 3A through 3H illustrate a pod-based container environment management methodology according to one or more illustrative embodiments.

As further depicted in FIG. 3A, physical storage system 302 comprises a storage array 320 on which volumes 326 (V1 and V2) are persisted. Volumes 326 correspond to the physically stored data of mapped volumes 316 associated with node 310-1.

API objects 303 depict various configuration objects that are managed during system operations. For example, as shown and as will be further explained below, API objects 303 comprise volume attachment objects 332-1 and 332-2. Volume attachment object 332-1 defines the correspondence between V1 at node 310-1 and V1 in storage array 320.

Similarly, volume attachment object 332-2 defines the correspondence between V2 at node 310-1 and V2 in storage array 320. Further, API objects 303 comprises persistent volume claim 334-1 (PVC1) and persistent volume claim 334-2 (PV2) which are the claim objects respectively corresponding to volumes V1 and V2. Also shown as part of API objects 303 are stateful set object 336 (STATEFUL SET 1), POD 1 object 338-1, NODE 1 object 339-1 and NODE 2 object 339-2, as will be further explained below. Lastly, as shown in FIG. 3A, controllers 304 comprise controller-podmon 342 and API service 344.

It should be understood that other components may be discussed below in the context of illustrative embodiments that are not expressly shown in FIGS. 3A through 3H for the sake of simplifying the illustration for a better understanding. However, it is to be understood that any such components may be implemented in one or more host devices 202 and/or storage system 204, and are therefore considered to be illustrated within the figures.

As will be illustrated below in the context of FIGS. 3B through 3H, controller-podmon 342 is tasked with discovering or otherwise learning various trigger actions that indicate a pod is in an unhealthy state because of a node failure. Controller-podmon 342 can be replicated (deployed on multiple nodes) and, in some embodiments, chooses a leader node using a standard Kubernetes leader-election protocol. Controller-podmon 342 can run on a master node (e.g., part of controller manager 112 on master node 110 in FIG. 1) and/or on one or more worker nodes (e.g., one or more worker nodes 120 in FIG. 1). In some embodiments, controller-podmon 342 can communicate with a CSI controller (e.g., part of controller manager 112 on master node 110 in FIG. 1), and can be collocated as a sidecar with CSI controller pods (e.g., on one or more worker nodes 120 in FIG. 1).

Controller-podmon 342 can determine pod failure on a failed node by one or more mechanisms. Two examples are respectively depicted in FIGS. 3B and 3C.

Figure 3B:
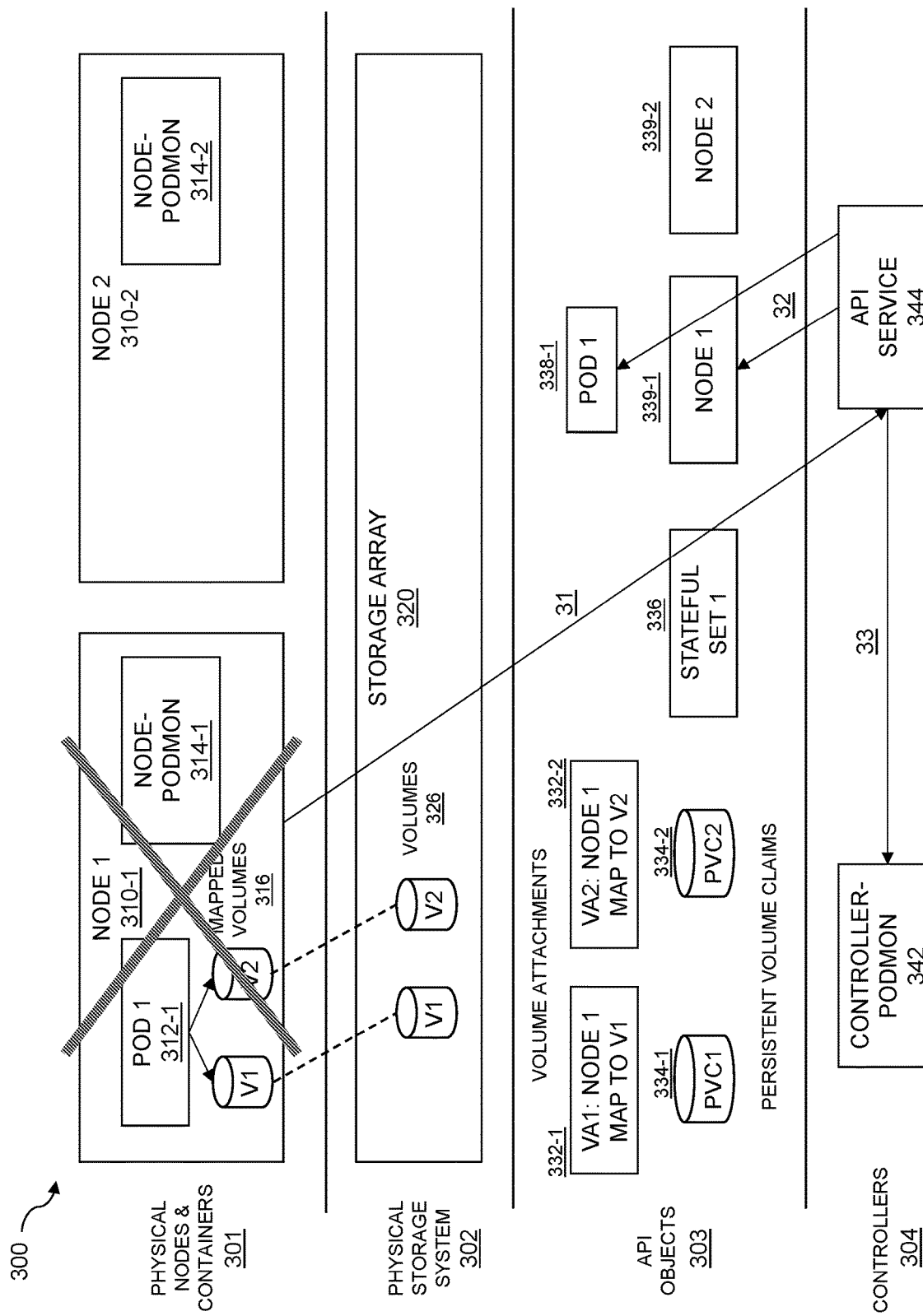

In FIG. 3B, in step 31, assume that API service 344 detects a failure of node 310-1 once API service 344 does not receive a periodic (heartbeat) signal from node 310-1. In step 32, API service 344 updates POD 1 object 338-1 and NODE 1 object 339-1 to failed status. In step 33, controller-podmon 342 receives a pod watch event notification from API service 344 that a pod of interest, i.e., pod 312-1, is down and upon verification determined that the node the pod is assigned to, i.e., 310-1, is down. Pods are indicated to be "of interest" to controller-podmon 342 by placing a pod-mon-specific label on the pod. In illustrative embodiments, controller-podmon 342 only takes action on pods with the designated label.

Figure 3C:
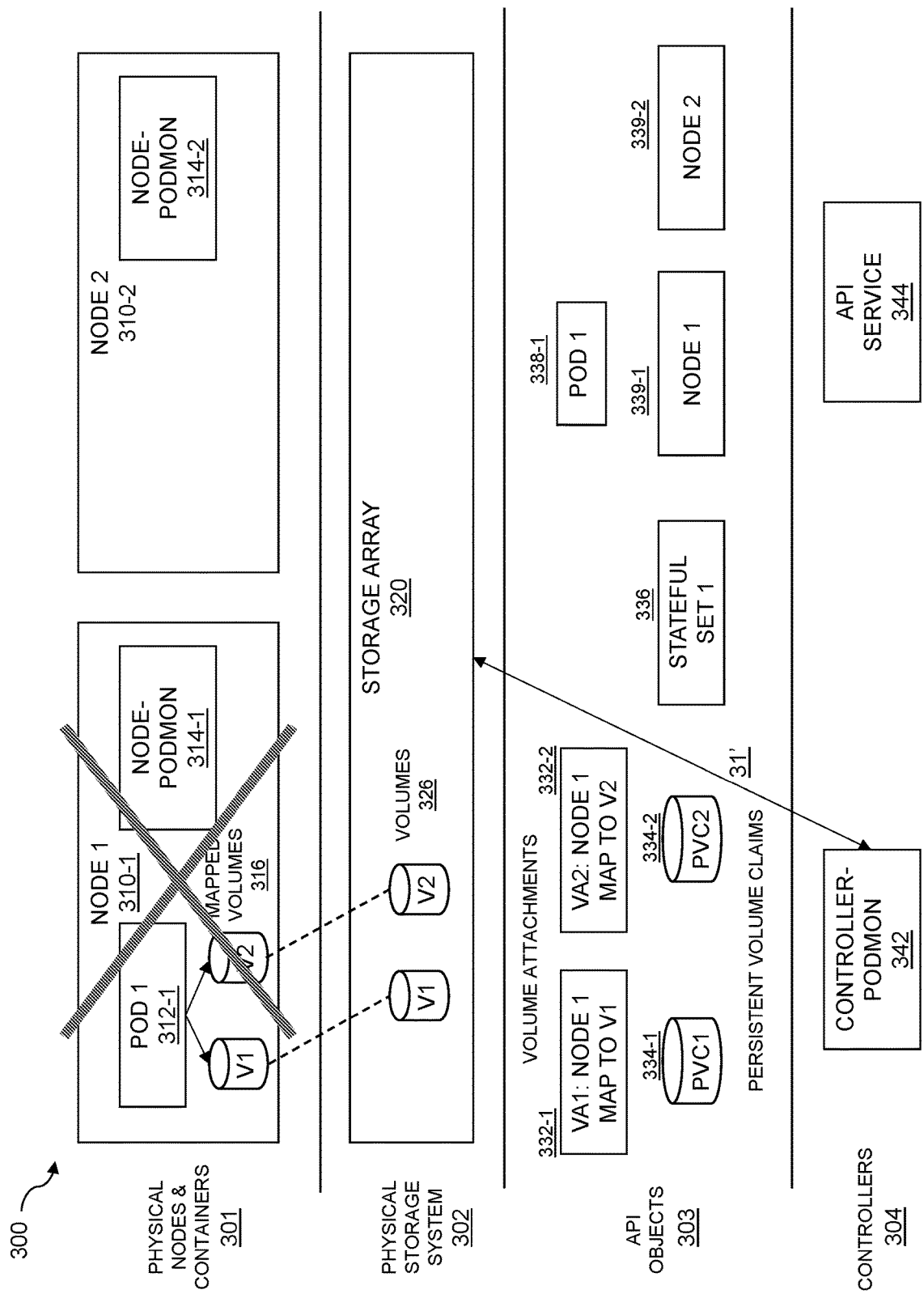

Additionally or alternatively, as shown in step 31' in FIG. 3C, controller-podmon 342 periodically queries storage array 320 to determine if storage array 320 has lost connectivity to the node that is used by a pod of interest, i.e., node 310-1. For example, storage array 320 is configured to know if it has one or more data path connections with node 310-1. Since volumes V1 and V2 are mapped from node 310-1 to storage array 320, it would be expected that one or more data path connections exist. If storage array 320 no longer has any such data path connections with node 310-1, then it is assumed that node 310-1 has failed. In another example, controller-podmon 342 asks, in its query (which could be sent periodically, e.g. every several second), whether storage array 320, since the last query or since some other predetermined previous time instance, has executed any IO operations on behalf of the pod of interest, i.e., pod 312-1, for the corresponding volumes V1 or V2. Again, it would be expected that IO would have been executed since the last query or since some other predetermined previous time instance. If storage array 320 has not executed IO from pod 312-1, then it is assumed that node 310-1 has failed. In some embodiments, the data path connectivity check and the IO execution check are both performed (e.g., one check serving as a verification for the other check). Also, if there is some information that controller-podmon 342 learns that would suggest that the node 310-1 will come back from this failed status in a given acceptable time frame, controller-podmon 342 can abort the fencing and cleanup operations that will otherwise be performed in subsequent steps, and wait for the pod/node to recover. If recovery does not occur, then the fencing and cleanup operations are performed.

Figure 3D:
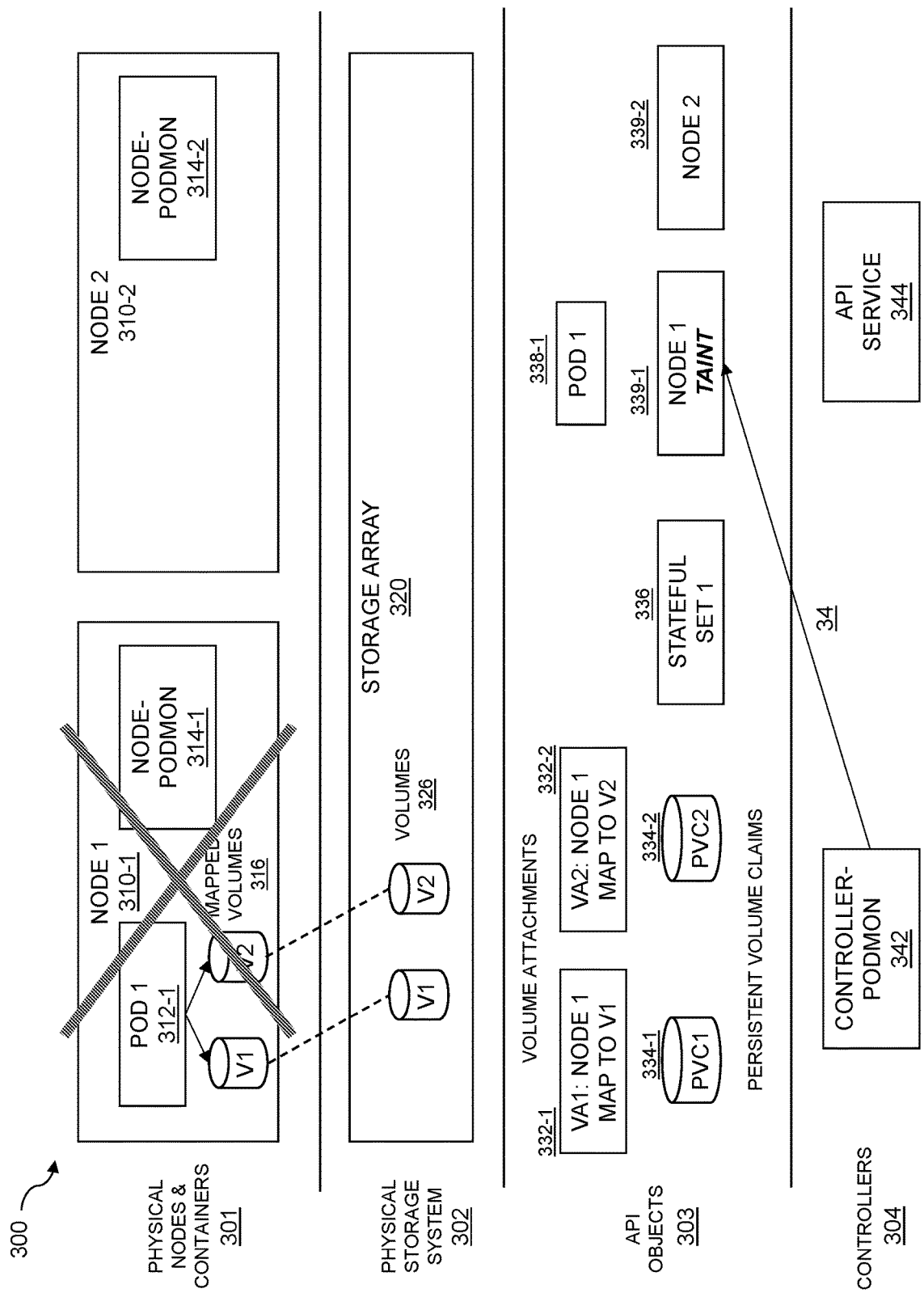

Turning now to FIG. 3D, controller-podmon 342 next starts the fencing (more generally, isolation) operation by placing an indicator in the form of a taint label on NODE 1 object 339-1 in step 34. The taint label ensures that, while the label is present on NODE 1 object 339-1, no new pods will be scheduled (by scheduler 114 on master node 110 of FIG. 1) for execution on node 310-1.

Figure 3E:
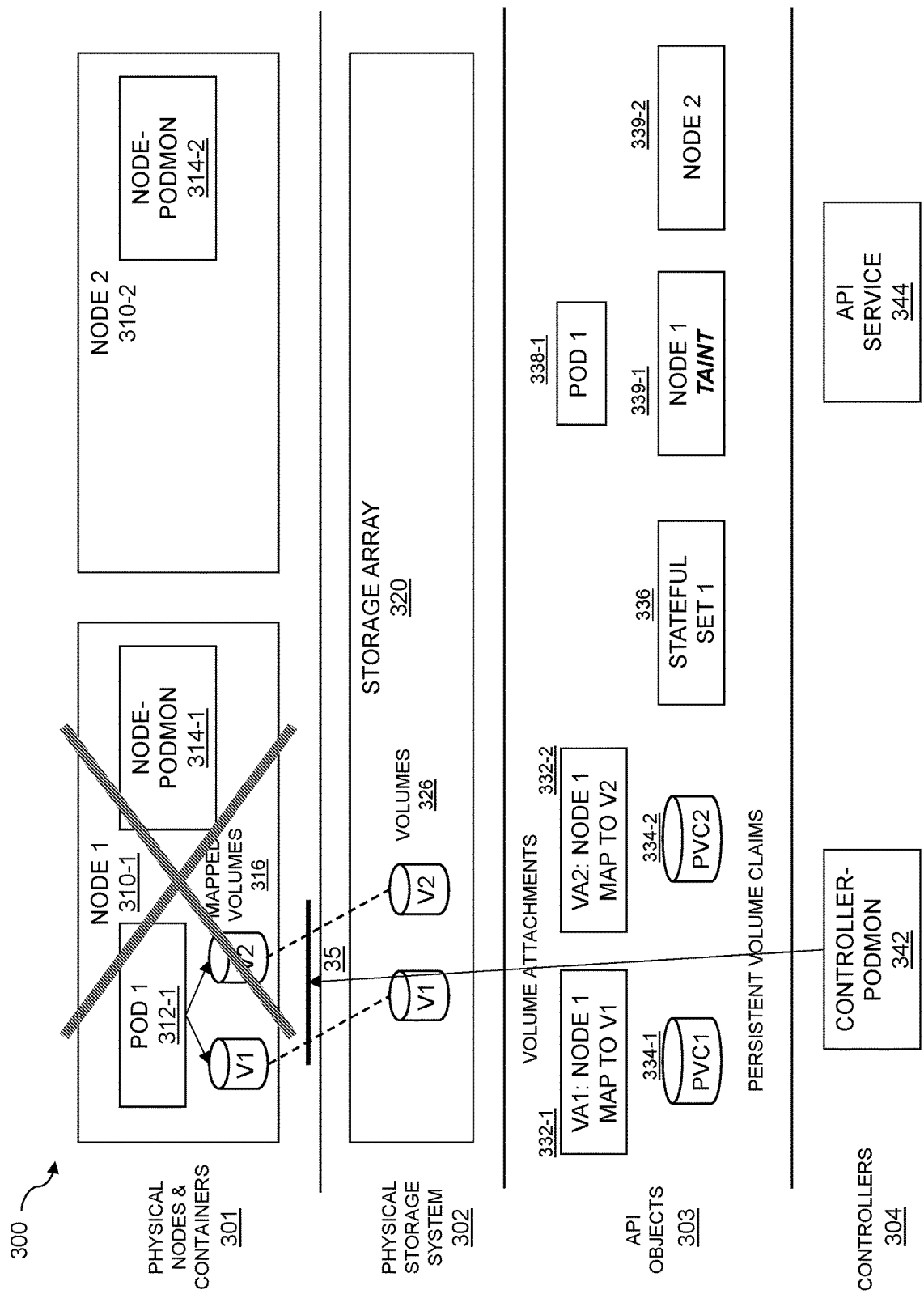

As shown in step 35 of FIG. 3E, controller-podmon 342 then contacts storage array 320, in some embodiments through a CSI driver, to fence the volumes (V1 and V2) used by pod 312-1 on the failed node 310-1. In some embodiments, this can be done by manipulating the volumes masking information of which nodes are allowed to access the volumes, and thereby removing all volume-access permissions of failed node 310-1.

Figure 3F:
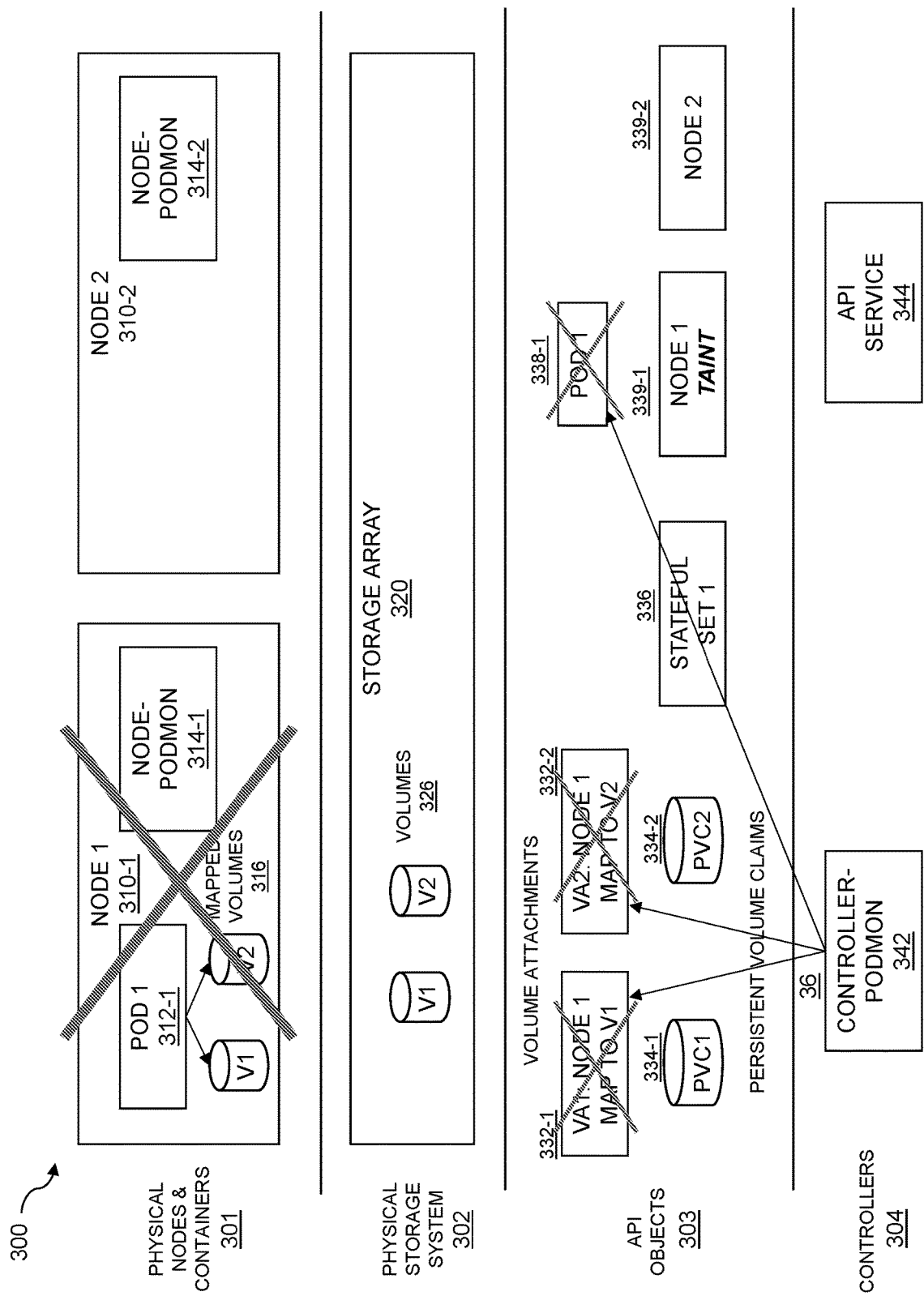
Figure 3G:
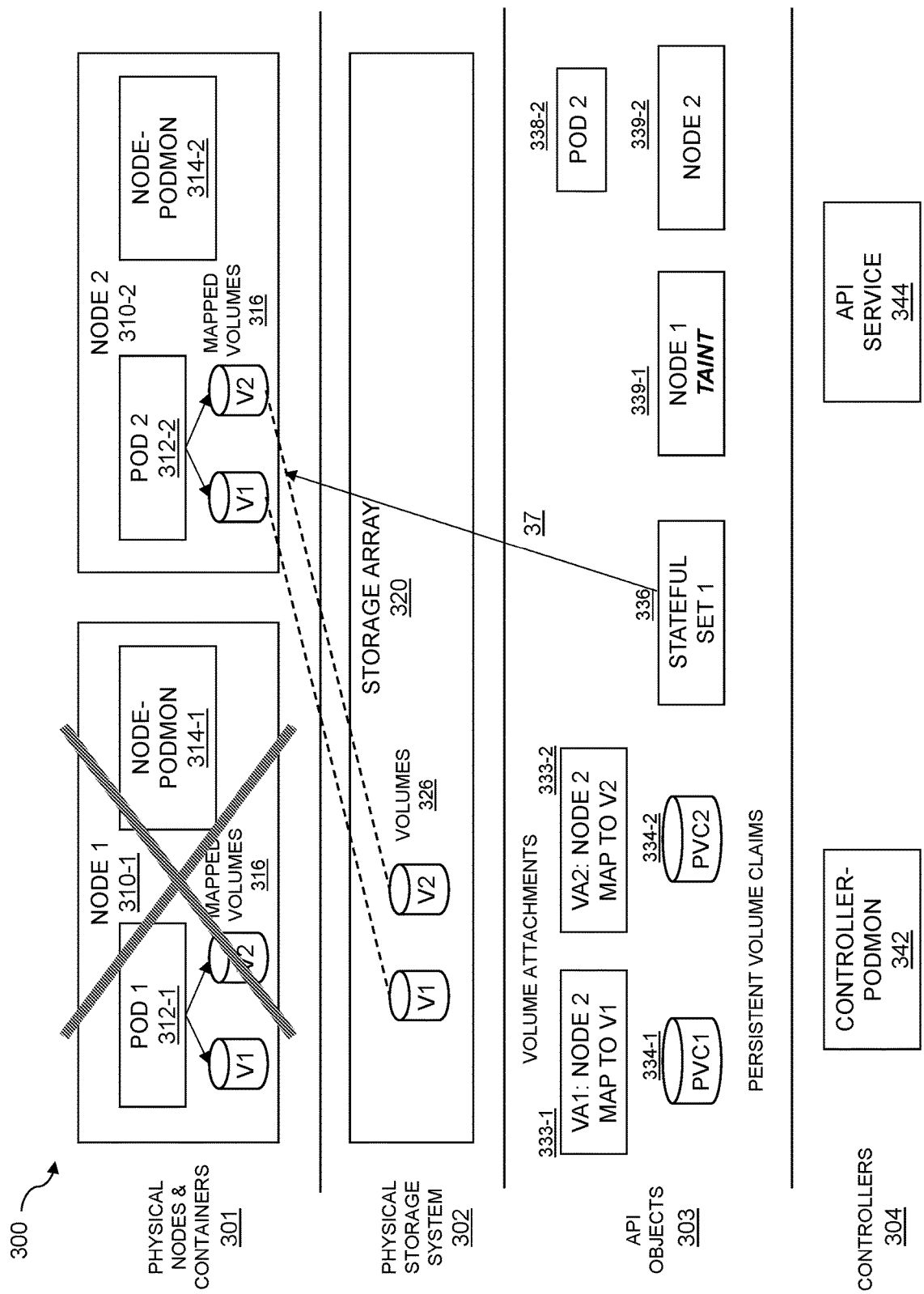

Turning now to step 36 of FIG. 3F, after fencing the volumes, the controller-podmon 342 then deletes the volume attachment objects 332-1 and 332-2, and the POD 1 object 338-1, associated with pod 312-1 of failed node 310-1. In some embodiments, step 36 also triggers a redundant ControllerUnpublish CSI operation that revokes access of node 310-1 to each of its failed pod's volumes (V1 and V2).

By force-deleting the pod object (338-1), this allows the scheduler (114 in FIG. 1) to schedule creation of a replacement pod for the failed pod on another node. The stateful set controller (e.g., mentioned above as part of controller manager 112 of master node 110 in FIG. 1) creates pods on nodes, including replacement pods. Thus, as shown in step 37 of FIG. 3G, in accordance with information in stateful set object 336, the stateful set controller creates a replacement of pod 312-1 on node 310-2 in the form of pod 312-2, including mapping volumes V1 and V2 to pod 312-2. This results in creation of a new pod object, i.e., POD 2 object 338-2, and new volume attachment objects 333-1 and 333-2.

Figure 3H:
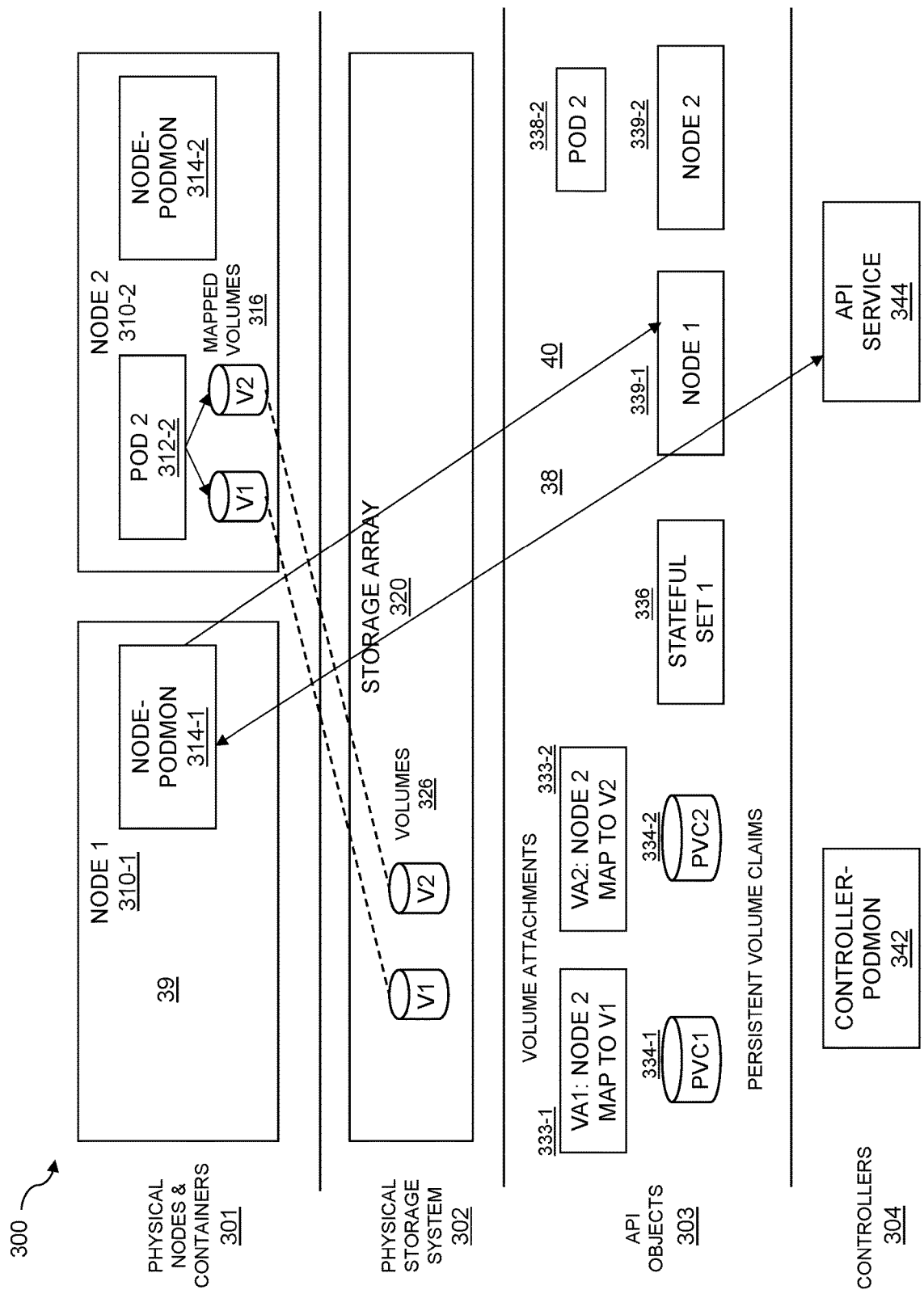

Next, the cleanup operation is performed as depicted in FIG. 3H. For the cleanup operation to occur, it is understood that node 310-1 has become operational again and node-podmon 314-1 is able to communicate with API service 344.

Recall that, in illustrative embodiments, an instance of node-podmon is running on every worker node. In general, node-podmon is responsible for cleaning up any stale pods and their remnants (more generally, artifacts) that have been replaced during the controller-podmon's fencing operation above. Thus, in the context of node 310-1, node-podmon 314-1 uses pod watch event notifications to keep a list of what pods of interest are running on its node. This list is used to clean up the replaced pods. For example, as depicted in step 38, node-podmon 314-1 periodically communicates with API service 344 to determine if it has API connectivity. If it has API connectivity, node-podmon 314-1 checks to see if its node has been tainted by controller-podmon 342.

Once node-podmon 314-1 determines its node has been tainted (i.e., a taint label previously applied to NODE 1 object 339-1 by controller-podmon 342), it is tasked with cleaning up any stale pods and remnants that have been replaced due to the controller-podmon fencing operation. For each of the pods on its node, node-podmon 314-1 causes the node to delete any containers associated with the pod when it compares information with the API service 344 and determines the corresponding pod object has been deleted. In some embodiments, node-podmon 314-1 calls NodeUnpublishVolume and the NodeUnstageVolume for each of the persistent volumes used by the replaced pod.

For example, as illustrated in step 39 of FIG. 3H, node-podmon 314-1 cleans up any artifacts of pod 312-1 on node 310-1, e.g., pod structures, mounts, and/or directory entries. Once node-podmon 314-1 has successfully cleaned up the replaced pod, node-podmon 314-1 then, in step 40, removes the node taint imposed by controller-podmon 342. Removal of the taint label from the NODE 1 object 339-1 then allows scheduling of new pods to resume on previously failed node 310-1, returning the node to full service.

Advantageously, one or more applications that were running in containers of pod 312-1 on node 310-1 now run in pod 312-2 on node 310-2, thus providing for automated application resiliency (especially for stateful applications) despite the occurrence of a node failure. Note that while FIGS. 3A through 3H show an example of one failed node and one replaced pod, the improved pod-based container environment management techniques described herein can be applied to environments with any number of nodes, pods, storage arrays, volumes, objects, controllers, etc. Also, it is to be understood that the order of steps performed in FIGS. 3A through 3H can be modified, and steps added or deleted, as appropriate for any given containerized workload environment.

Furthermore, illustrative embodiments overcome drawbacks of existing node failure management techniques that leave pod-based container environments vulnerable to scenarios where a previously failed node comes back online but was not rebooted and now there is a replaced pod still running on the previously failed node. Should the active pod for the application ever be rescheduled back to the same node, there is the potential for the replaced pod and a replacement pod of the same application, using the same volumes, to be running on the node, which can cause data corruption. Illustrative embodiments also overcome the existing approach wherein, if a node is determined to have failed, the failed node is always shutdown, then removed from the cluster before the replacement pods are created. This causes longer failure recovery times, and the forced reboot affects other pods not using persistent volumes (such as compute intensive pods) that are resident on the failed node.

In contrast, illustrative embodiments leverage a node taint mechanism to prevent new or replacement pods from being scheduled to the failed node until the node has regained health and has been cleaned of any stale, replaced pods. Illustrative embodiments provide many benefits, by way of example only: (i) superior recovery times versus rebooting and removing the nodes; (ii) a robust mechanism for handling node cleanup; and prevention of new or replacement pods from being scheduled to a failed node until the node has regained health and has been cleaned up.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing failures in container environments will now be described in greater detail with reference to FIGS. 4 and 5. Although described in the context of systems 200/300, these platforms may also be used to implement at least portions of other information processing systems in other embodiments.

Figure 4:
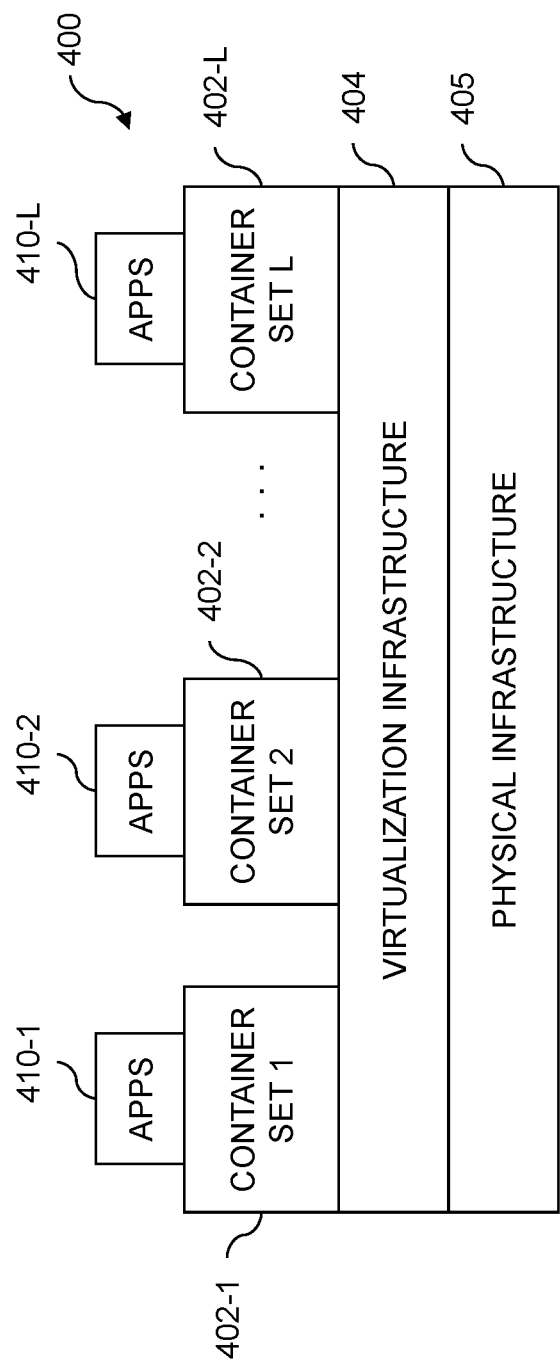
FIGS. 4 and 5 show examples of processing platforms that may be utilized to implement at least a portion of an information processing system with a pod-based container environment according to one or more illustrative embodiments.
Figure 5:
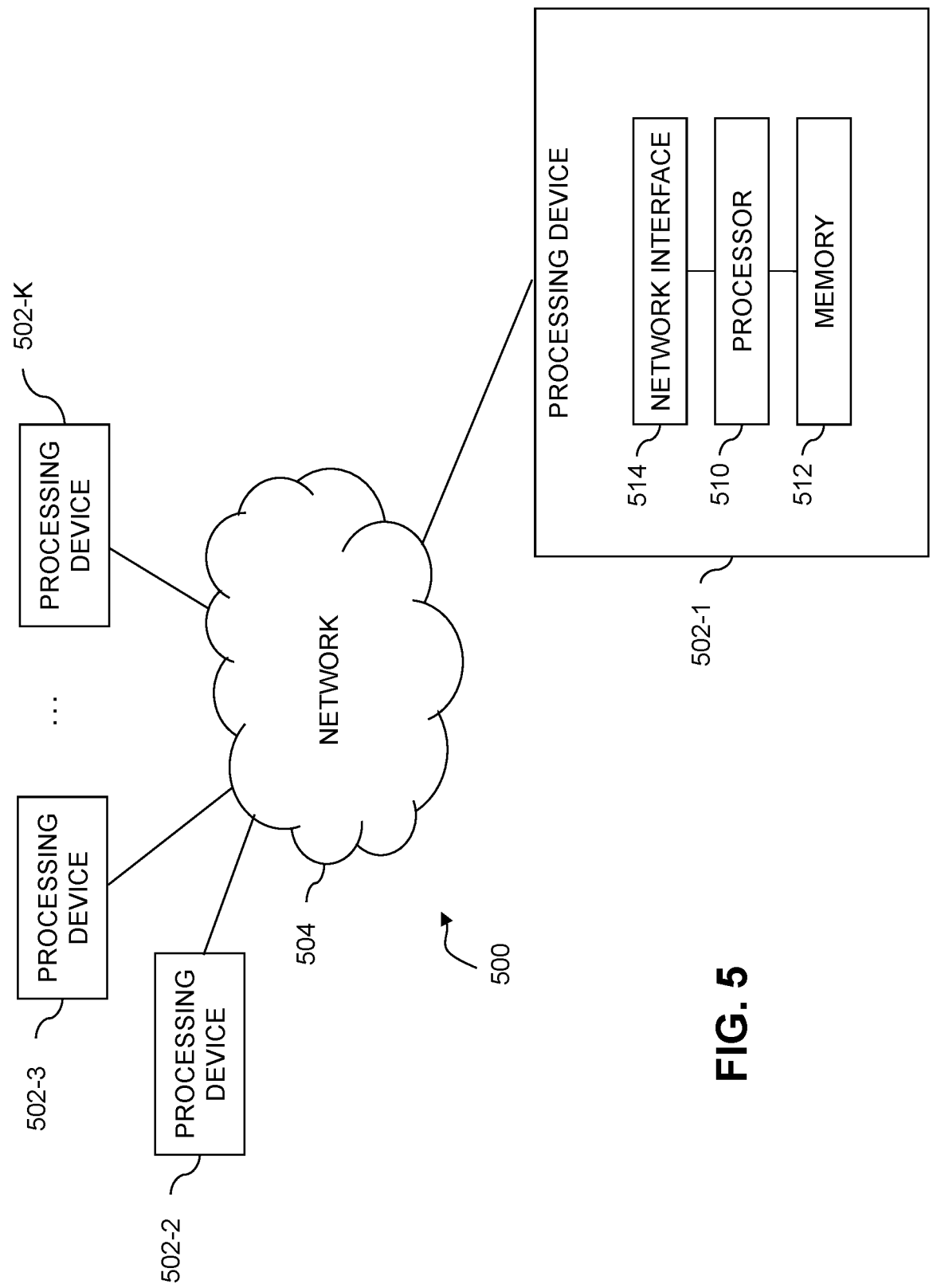

FIG. 4 shows an example processing platform comprising cloud infrastructure 400. The cloud infrastructure 400 comprises a combination of physical and virtual processing resources that may be utilized to implement at least a portion of the information processing system 200/300. The cloud infrastructure 400 comprises multiple container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure.

The cloud infrastructure 400 further comprises sets of applications 410-1, 410-2, . . . 410-L running on respective ones of the container sets 402-1, 402-2, . . . 402-L under the control of the virtualization infrastructure 404. The container sets 402 may comprise respective sets of one or more containers.

In some implementations of the FIG. 4 embodiment, the container sets 402 comprise respective containers implemented using virtualization infrastructure 404 that provides operating system level virtualization functionality, such as support for Kubernetes-managed containers.

As is apparent from the above, one or more of the processing modules or other components of system 200/300 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 200/300 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and systems 200/300 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
determine when a first node executing at least one containerized workload in an information processing system has failed;
in response to determining the first node has failed, mark a configuration object for the first node with an indicator that the first node is not to be used to schedule execution of a subsequent containerized workload;
isolate, from the first node, one or more storage volumes used by the first node when executing the at least one containerized workload;
delete configuration objects for the one or more storage volumes and for the at least one containerized workload executed by the first node;
cause creation of a replacement containerized workload for execution on a second node in the information processing system;
remove one or more artifacts associated with the at least one containerized workload from the first node; and
remove the indicator from the configuration object for the first node.

2. The apparatus of claim 1, wherein determining when a first node executing at least one containerized workload in an information processing system has failed further comprises monitoring for receipt of a periodic signal received from the first node.

3. The apparatus of claim 1, wherein determining when a first node executing at least one containerized workload in an information processing system has failed further comprises querying a storage system used by the first node when executing the at least one containerized workload to determine whether or not the storage system has, within a given time period, at least one of: (i) maintained one or more data path connections with the first node; and (ii) executed one or more input-output operations for the first node.

4. The apparatus of claim 1, wherein the processing platform, when executing program code, is further configured to, after determining the first node has failed, update one or more configuration objects associated with the first node to a failed status.

5. The apparatus of claim 1, wherein marking a configuration object for the first node with an indicator that the first node is not to be used to schedule execution of a subsequent containerized workload further comprises marking the configuration object with a taint label.

6. The apparatus of claim 1, wherein isolating, from the first node, one or more storage volumes used by the first node when executing the at least one containerized workload further comprises fencing the one or more storage volumes from the first node.

7. The apparatus of claim 1, wherein causing creation of a replacement containerized workload for execution on a second node in the information processing system further comprises:
causing creation of a configuration object for the replacement containerized workload; and
causing mapping of the one or more storage volumes to the replacement containerized workload.

8. The apparatus of claim 1, wherein the at least one containerized workload and the replacement containerized workload are executable in respective pods on the first node and the second node.

9. The apparatus of claim 8, wherein the at least one processing platform further comprises a pod monitoring controller.

10. The apparatus of claim 8, wherein the at least one processing platform further comprises a pod monitor on the first node.

11. A method comprising:
determining when a first node executing at least one containerized workload in an information processing system has failed;
in response to determining the first node has failed, marking a configuration object for the first node with an indicator that the first node is not to be used to schedule execution of a subsequent containerized workload;
isolating, from the first node, one or more storage volumes used by the first node when executing the at least one containerized workload;
deleting configuration objects for the one or more storage volumes and for the at least one containerized workload executed by the first node;
causing creation of a replacement containerized workload for execution on a second node in the information processing system;
removing one or more artifacts associated with the at least one containerized workload from the first node; and
removing the indicator from the configuration object for the first node.

12. The method of claim 11, wherein determining when a first node executing at least one containerized workload in an information processing system has failed further comprises monitoring for receipt of a periodic signal received from the first node.

13. The method of claim 11, wherein determining when a first node executing at least one containerized workload in an information processing system has failed further comprises querying a storage system used by the first node when executing the at least one containerized workload to determine whether or not the storage system has, within a given time period, at least one of: (i) maintained one or more data path connections with the first node; and (ii) executed one or more input-output operations for the first node.

14. The method of claim 11, further comprising updating one or more configuration objects associated with the first node to a failed status.

15. The method of claim 11, wherein marking a configuration object for the first node with an indicator that the first node is not to be used to schedule execution of a subsequent containerized workload further comprises marking the configuration object with a taint label.

16. The method of claim 11, wherein isolating, from the first node, one or more storage volumes used by the first node when executing the at least one containerized workload further comprises fencing the one or more storage volumes from the first node.

17. The method of claim 11, wherein causing creation of a replacement containerized workload for execution on a second node in the information processing system further comprises:
causing creation of a configuration object for the replacement containerized workload; and
causing mapping of the one or more storage volumes to the replacement containerized workload.

18. A computer program product comprising a non-transitory processor-readable storage medium having stored therein program code of one or more software programs, wherein the program code when executed by at least one processing platform causes the at least one processing platform to:
determine when a first node executing at least one containerized workload in an information processing system has failed;
in response to determining the first node has failed, mark a configuration object for the first node with an indicator that the first node is not to be used to schedule execution of a subsequent containerized workload;
isolate, from the first node, one or more storage volumes used by the first node when executing the at least one containerized workload;
delete configuration objects for the one or more storage volumes and for the at least one containerized workload executed by the first node;
causing creation of a replacement containerized workload for execution on a second node in the information processing system;
remove one or more artifacts associated with the at least one containerized workload from the first node; and
remove the indicator from the configuration object for the first node.

19. The computer program product of claim 18, wherein marking a configuration object for the first node with an indicator that the first node is not to be used to schedule execution of a subsequent containerized workload further comprises marking the configuration object with a taint label.

20. The computer program product of claim 18, wherein isolating, from the first node, one or more storage volumes used by the first node when executing the at least one containerized workload further comprises fencing the one or more storage volumes from the first node.

* * * * *